United States Patent
Lin et al.

(10) Patent No.: US 10,467,054 B2
(45) Date of Patent: Nov. 5, 2019

(54) RESOURCE MANAGEMENT METHOD AND SYSTEM, AND COMPUTER STORAGE MEDIUM

(71) Applicant: ONEPLUS TECHNOLOGY (SHENZHEN) CO., LTD., Shenzhen (CN)

(72) Inventors: Kengyu Lin, Shenzhen (CN); Wenyen Chang, Shenzhen (CN)

(73) Assignee: ONEPLUS TECHNOLOGY (SHENZHEN) CO., LTD., Shenzhen, Guangdon (CN)

( * ) Notice: Subject to any disclaimer, the term of this patent is extended or adjusted under 35 U.S.C. 154(b) by 0 days.

(21) Appl. No.: 15/774,282

(22) PCT Filed: Aug. 18, 2016

(86) PCT No.: PCT/CN2016/095906
§ 371 (c)(1),
(2) Date: May 8, 2018

(87) PCT Pub. No.: WO2017/080276
PCT Pub. Date: May 18, 2017

(65) Prior Publication Data
US 2018/0329750 A1    Nov. 15, 2018

(30) Foreign Application Priority Data
Nov. 9, 2015   (CN) .......................... 2015 1 0756289

(51) Int. Cl.
*G06F 9/46* (2006.01)
*G06F 9/50* (2006.01)
(Continued)

(52) U.S. Cl.
CPC ................ *G06F 9/50* (2013.01); *G06F 1/329* (2013.01); *G06F 9/4881* (2013.01); *Y02D 10/24* (2018.01); *Y02D 50/20* (2018.01)

(58) Field of Classification Search
None
See application file for complete search history.

(56) References Cited

U.S. PATENT DOCUMENTS 9,201,693 B2   12/2015  Fuller
2003/0014467 A1  1/2003  Hanzawa
(Continued)

FOREIGN PATENT DOCUMENTS

CN       1287282 C      11/2006
CN     100543682 C      9/2009
(Continued)

OTHER PUBLICATIONS

International Search Report in international application number: PCT/CN2016/095906, dated Nov. 18, 2016.
(Continued)

*Primary Examiner* — Gregory A Kessler
(74) *Attorney, Agent, or Firm* — Syncoda LLC; Feng Ma

(57) ABSTRACT

Provided is a resource management method and system, and a computer storage medium. The method comprises: determining tasks within a task group and a preset task time corresponding to each task within the task group (S110); determining whether the sum of the preset task times corresponding to all the tasks in the task group is less than a preset time threshold (S120); if yes, then determining the resource usage time quota of the task group to be the sum of the preset task times corresponding to all the tasks in the task group (S130); if no, then determining the resource usage time quota of the task group to be the time threshold (S140); determining the allowable run time per unit time for each
(Continued)

task in the task group (S150); within unit time, when each task in the task group is outside of the corresponding run period, the respective task in the task group are respectively entered into a waiting state (S160).

18 Claims, 9 Drawing Sheets

(51) Int. Cl.
*G06F 1/329* (2019.01)
*G06F 9/48* (2006.01)

(56) References Cited

U.S. PATENT DOCUMENTS

| | | |
|---|---|---|
| 2004/0015971 A1 | 1/2004 | Spoltore |
| 2012/0179793 A1 | 7/2012 | Jahagirdar |
| 2014/0015971 A1 | 1/2014 | Dejuliis |
| 2014/0068624 A1 | 3/2014 | Fuller |

FOREIGN PATENT DOCUMENTS

| | | |
|---|---|---|
| CN | 102662743 A | 9/2012 |
| CN | 103077086 A | 5/2013 |
| CN | 103902364 A | 7/2014 |
| CN | 104838360 A | 8/2015 |
| CN | 105320561 A | 2/2016 |
| CN | 105320570 A | 2/2016 |
| EP | 2449849 A1 | 5/2012 |

OTHER PUBLICATIONS

English Translation of the Written Opinion of the International Search Authority in international application No: PCT/CN2016/095906, dated Nov. 18, 2016.
Chahar Vaishali et al: "Fuzzy based multilevel queue scheduling algorithm", 2013 International Conference on Advances in Computing, Communications and Informatics (ICACCI), IEEE, Aug. 22, 2013 (Aug. 22, 2013), pp. 115-120, XP032510101, DOI: 10.1109/ICACCI.2013.6637156 ISBN: 978-1-4799-2432-5 [retrieved on Oct. 18, 2013] * title; pp. 115-119; figures 1-5 *.
Mohammed Maysoon A et al: "Queueing theory study of round robin versus priority dynamic quantum time round robin scheduling algorithms", 2015 4th International Conference Onsoftware Engineering and Computer Systems (ICSECS), IEEE, Aug. 19, 2015 (Aug. 19, 2015), pp. 189-194, XP032815548, DOI: 10.1109/ICSECS.2015.7333108 [retrieved on Nov. 20, 2015] * section V; p. 190 *.
Supplementary European Search Report in European application No. 16863454.1, dated Oct. 12, 2018.

RESOURCE MANAGEMENT METHOD AND SYSTEM, AND COMPUTER STORAGE MEDIUM

TECHNICAL FIELD

The disclosure relates to the technical field of operating systems, and particularly to a source management method and system and a computer storage medium.

BACKGROUND

At present, many computing devices (for example, smart phones and tablet computers, etc.) support multitask systems, that is, the devices can run multiple applications at the same time, there may be one or more threads in one application, and one task is run on each thread. In multiple tasks, there will be resource competition among tasks, for example, foreground tasks and background tasks. The background tasks will preempt the resources of foreground tasks, and sometimes prevent the foreground tasks from running. The resources may be a Central Processing Unit (CPU), a Graphics Processing Unit (GPU), a memory and the like. To solve this problem, a traditional method is to completely suspend tasks which would prevent main tasks from running. However, some suspended tasks are required to communicate with a server in real time, for example, messaging or mail services. If these tasks are completely suspended, it will cause the problem that information cannot be timely feedback or the problem with other unexpected behaviors or the like.

SUMMARY

In view of this, it is necessary to provide a resource management method, which can ensure normal running of each task in a group, can also reduce resource competition between the tasks in the group and other tasks outside the group and save resources.

In addition, it is also necessary to provide a resource management system, which can ensure normal running of each task in the group, can also reduce resource competition between the tasks in the group and other tasks outside the group and save resources.

Moreover, an embodiment of the disclosure provides a computer storage medium, which can not only ensure normal running of background tasks but also reduce resource competition between background tasks and foreground tasks and save resources.

A resource management method according to embodiments of the disclosure comprises:
determining tasks in a task group and a preset task time corresponding to each task in the task group;
judging whether a sum of the preset task times corresponding to all the tasks in the task group is less than a preset time threshold;
if YES, determining a resource usage time quota of the task group as the sum of the preset task times corresponding to all the tasks in the task group;
if NO, determining the resource usage time quota of the task group as the time threshold;
determining allowable run time per unit time for each task in the task group, a sum of the allowable run time per unit time for all the tasks in the task group being less than or equal to the resource usage time quota of the task group; and
when each task in the task group is outside a corresponding running period in unit time, putting each task in the task group into a waiting state.

In one of the embodiment, before the step of determining the tasks in the task group and the preset task time corresponding to each task in the task group, the method further comprises:
creating a task group, and adding specific tasks into the task group according to a predetermined rule.

In one of the embodiment, the step of determining the allowable run time per unit time for each task in the task group specifically comprises:
acquiring priorities of the tasks in the task group;
judging whether the priorities of the tasks in the task group are the same;
if the priorities of the tasks in the task group are the same and there are no tasks outside the task group being executed, determining that the allowable run time per unit time for each task in the task group is the resource usage time quota of the task group divided by the number of the tasks in the task group; and
if NO, determining the allowable run time per unit time for each task in the task group according to a predetermined algorithm based on the priorities of the tasks in the task group.

In one of the embodiment, the determining the allowable run time per unit time for of each task in the task group specifically comprises:
acquiring priorities of the tasks outside the task group being executed and the tasks in the task group;
judging whether the priorities of the tasks outside the task group and the tasks in the task group are the same;
if YES, determining that the allowable run time per unit time for each task in the task group is the resource usage time quota of the task group divided by a sum of the number of the tasks outside the task group and the number of the tasks in the task group; and
if NO, determining the allowable run time per unit time for each task in the task group according to the predetermined algorithm based on the priorities of the tasks outside the task group and the tasks in the task group.

In one of the embodiment, after the step putting each task in the task group into the waiting state when each task in the task group is outside the corresponding running period in unit time, the method may further comprises:
judging whether there are tasks outside the task group being executed when each task in the task group is put into the waiting state;
if YES, determining that the tasks outside the task group obtain all resource usage time; and
if NO, entering a sleep state.

A resource management system according to the embodiments of the disclosure comprises:
a task determination module configured to determine tasks in a task group and a preset task time corresponding to each task in the task group;
a first judgment module configured to judge whether a sum of the preset task times corresponding to all the tasks in the task group is less than a preset time threshold;
a group time determination module configured to determine that a resource usage time quota of the task group is the sum of the preset task times corresponding to all the tasks in the task group when the sum of the preset task times corresponding to all the tasks in the task group is less than the preset time threshold,
the group time determination module further configured to determine that the resource usage time quota of the task group is the time threshold when the sum of the preset task times corresponding to all the tasks in the task group is not less than the preset time threshold;

a running time determination module configured to determine allowable run time per unit time for each task in the task group, a sum of the allowable run time per unit time for all the tasks in the task group being less than or equal to the resource usage time quota of the task group; and a waiting module configured to put each task in the task group into a waiting state when each task of the task group is outside a corresponding run period in unit time.

In one of the embodiments, the system further comprises:

a creation module configured to create the task group and add specific tasks into the task group according to a predetermined rule.

In one of the embodiment, the run time determination module comprises:

an acquisition unit configured to acquire priorities of tasks in the task group;

a judgment unit configured to judge whether the priorities of the tasks in the task group are the same; and a determination unit configured to determine that the allowable run time per unit time for each task in the task group is the resource usage time quota of the task group divided by the number of the tasks in the task group when the priorities of the tasks in the task group are the same and no tasks outside the task group are being executed;

the determination unit further configured to determine the allowable run time per unit time for each task in the task group according to a predetermined algorithm based on the priorities of the tasks in the task group when the priorities of the tasks in the task group are different.

In one of the embodiments, the acquisition unit is further configured to acquire priorities of tasks outside the task group being executed and the tasks in the task group;

the judgment unit is further configured to judge whether the priorities of the tasks outside the task group and the tasks in the task group are the same;

the determination unit is further configured to determine that the allowable run time per unit time for each task in the task group is the resource usage time quota of the task group divided by a sum of the number of the tasks outside the task group and the number of the tasks in the task group when the priorities of the tasks outside the task group and the tasks in the task group are the same; and the determination unit is further configured to determine the allowable run time per unit time for each task in the task group according to the predetermined algorithm based on the priorities of the tasks outside the task group and the tasks in the task group when the priorities of the tasks outside the task group and the tasks in the task group are different.

In one of the embodiments, the system further comprises:

a second judgment module configured to judge whether there are tasks outside the task group being executed when each task in the task group is put into the waiting state;

the run time determination module further configured to determine that the tasks outside the task group obtain all resource usage time when there are the tasks outside the task group being executed if each task in the task group is put into the waiting state; and a sleep module configured to enter a sleep state when there are no tasks outside the task group being executed if each task in the task group is put into the waiting state.

When performing processing, the task determination module, the first judgment module, the group time determination module, the run time determination module, the waiting module, the creation module, the acquisition unit, the judgment unit, the determination unit, the second judgment module and the sleep module may be implemented by a central processing unit (CPU), a Digital Signal Processor (DSP) or a Field-Programmable Gate Array (FPGA).

The embodiments of the disclosure further provide a computer storage medium storing computer-executable instructions configured to perform the resource management method according to any one of the above embodiments.

The resource management method and system and the computer storage medium described above, can determine the resource usage time quota of the group by comparing the sum of the preset task times corresponding to all the tasks in the task group and the preset time threshold, which can dynamically control the resources available for the tasks in the group according to the preset task time corresponding to each task in the group, thereby ensuring that the resource usage time obtained by each task in the group is within a reasonable range, improving resource usage efficiency and saving resources. In addition, each task in the group only is run in the corresponding running period in unit time, which can not only guarantee the completion of work in the group, but also reduce resource competition with the tasks outside the group, so that the tasks outside the group have higher resource usage efficiency.

When all the tasks in the group are putting into the waiting state and there are no tasks outside the group being executed, the sleep state is entered, which can reduce power consumption of the device.

DETAILED DESCRIPTION

To make the objectives, technical solutions and advantages of the disclosure clearer, the disclosure is further to be described below in detail with reference to the attached drawings and embodiments. It should be understood that the specific embodiments described herein are employed only to explain the disclosure and not to limit the disclosure.

Figure 1:
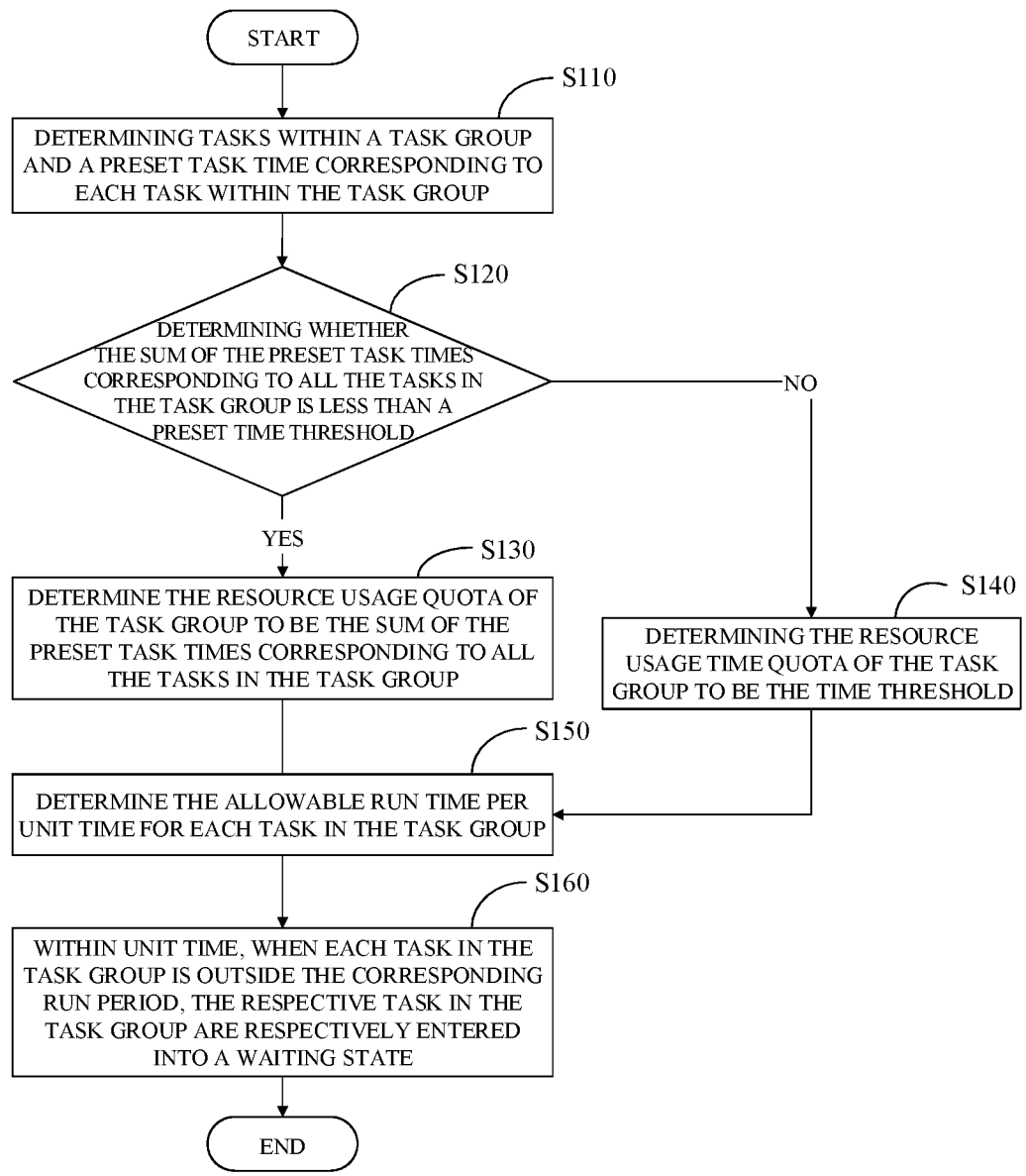
FIG. 1 is a schematic flowchart of a resource management method according to an embodiment.

As shown in FIG. 1, a resource management method includes the following steps:

Step S110: determining tasks in a task group and a preset task time corresponding to each task in the task group.

Specifically, the preset task time is a preset resource usage time upper limit available for the task in the task group in unit time. That is, run time per unit time for each task in the task group does not exceed its corresponding task time. In this embodiment, the preset task times corresponding to all the tasks in the task group can be set to be the same. For example, assuming that the unit time is 2T and the task time is L, L may be T/2, T/4 and the like. Each task in the task group can at most use resources of time L every unit time of 2T. T may be a numerical value of relatively short time such as 10 seconds (s), 15 s and 20 s. The resources may be a CPU, a GPU, a memory and the like. It can be understood that the preset task time corresponding to each task in the task group may be set according to actual needs, and is not necessarily the same.

In one embodiment, before the step of determining the tasks in the task group and the preset task time corresponding to each task in the task group, the method further includes: creating the task group and adding specific tasks into the task group according to a predetermined rule.

Specifically, the task group is created to manage the tasks. Only the tasks in the task group are limited by the resource usage time quota of the task group. The tasks in the task group may be background tasks which are not required to interact with a user, for example, background tasks such as mail service, messaging and automatic saving. Some tasks are added into the task group, and resource usage is limited, which can ensure that tasks in the task group can be performed normally, and prevent tasks in the task group from unrestrictedly preempting resources with other tasks outside the task group, thereby causing a waste of resource waste. It can be understood that other rules may also be set as needed, and then specific tasks consistent with the rule are added into the task group.

Step S120: judging whether a sum of the preset task times corresponding to all the tasks in the task group is less than a preset time threshold, if YES, performing step S130, and if NO, performing step S140.

Figure 2:
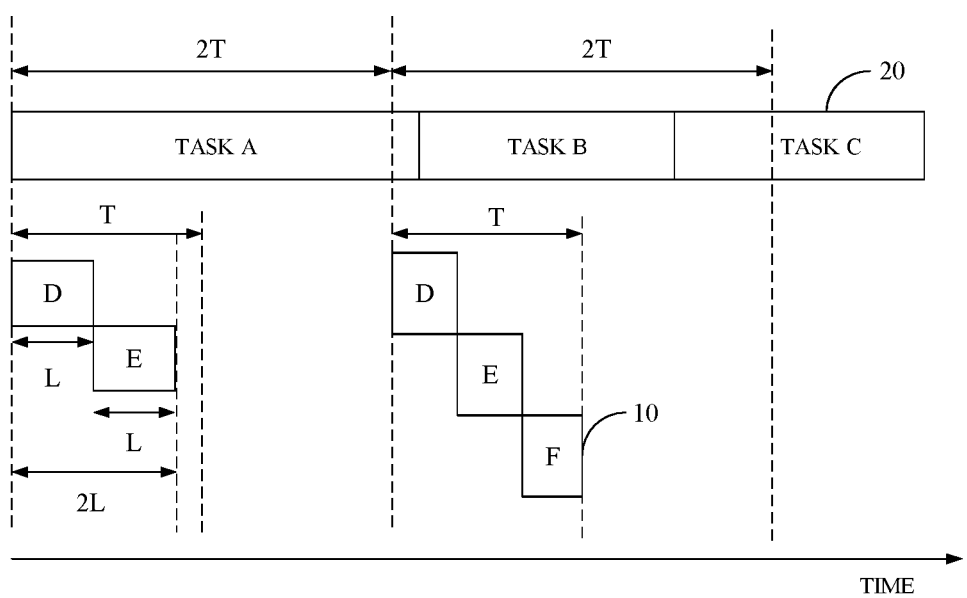
FIG. 2 is a schematic diagram of determining a resource usage time quota of a task group according to an embodiment.

Specifically, the time threshold is a preset resource usage time upper limit of the task group per unit time. The unit time, the time threshold and the task time can be set as needed. The relationship among the three is that the unit time is greater than the time threshold and the time threshold is greater than the task time. The sum of the preset task times corresponding to all the tasks in the task group and the time threshold are compared; if the sum of the preset task times corresponding to all the tasks in the task group is less than the time threshold, the resource usage time quota of the task group in unit time is determined as the sum of the preset task times corresponding to all the tasks in the task group; and if the sum of the preset task times corresponding to all the tasks in the task group is not less than the time threshold, the resource usage time quota of the task group in unit time is determined as the time threshold. As shown in FIG. 2, a task 20 outside a task group and the task group 10 are included. The preset task time corresponding to tasks D and E in the task group 10 is set to L, and the time threshold is set to T. In the first unit time of 2T, a sum of the preset task time corresponding to the tasks D and E in the task group 10 is 2L, which is less than the preset time threshold T, and then the resource usage time quota of the task group 10 is 2L. In the second unit time of 2T, the task group 10 includes tasks D, E and F, and the preset task time corresponding to the tasks D, E and F in the task group 10 is set to L. The sum of the preset task time corresponding to the tasks D, E and F in the task group 10 is 3L, which is greater than the time threshold T, and then the resource usage time quota of the task group 10 is T. A sum of the allowable run time per unit time for all the tasks in the task group is less than or equal to the resource usage time quota of the task group.

Step S130: determining the resource usage time quota of the task group as the sum of the preset task times corresponding to all the tasks in the task group Specifically, the resource usage time quota of the task group is determined by comparing the sum of the preset task times corresponding to all the tasks in the task group with the time threshold, which can avoid resource waste when the tasks in the task group is too few, and can control resource usage time obtained by each task in the task group within a reasonable range. For example, if the unit time is set to 2T, and the time threshold is set to T, there is only one task in the task group and the preset task time corresponding to the task is T/4. If the resource usage time quota of the task group is not determined by comparing the sum of the preset task times corresponding to all the tasks in the task group with the time threshold, the task can use resource of T time in unit time of 2T, which may cause problems such as low resource usage efficiency and the like. However, after the resource usage time quota of the task group is determined by comparison, the task can at most use resource of T/4 time in unit time of 2T, which can improve resource usage efficiency.

Step S140: determining the resource usage time quota of the task group as the time threshold Step S150: determining allowable run time of each task in the task group in unit time Specifically, time is divided into a plurality of continuous unit time for monitoring. The tasks in the task group only have a resource usage right in a portion of the unit time, that is, each task in the task group is run only in the corresponding portion of unit time period, and the duration of the portion of time period is equal to the previously determined allowable run time. A sum of the allowable run time per unit time for all the tasks in the task group is less than or equal to the previously determined resource usage time quota of the task group.

Figure 3:
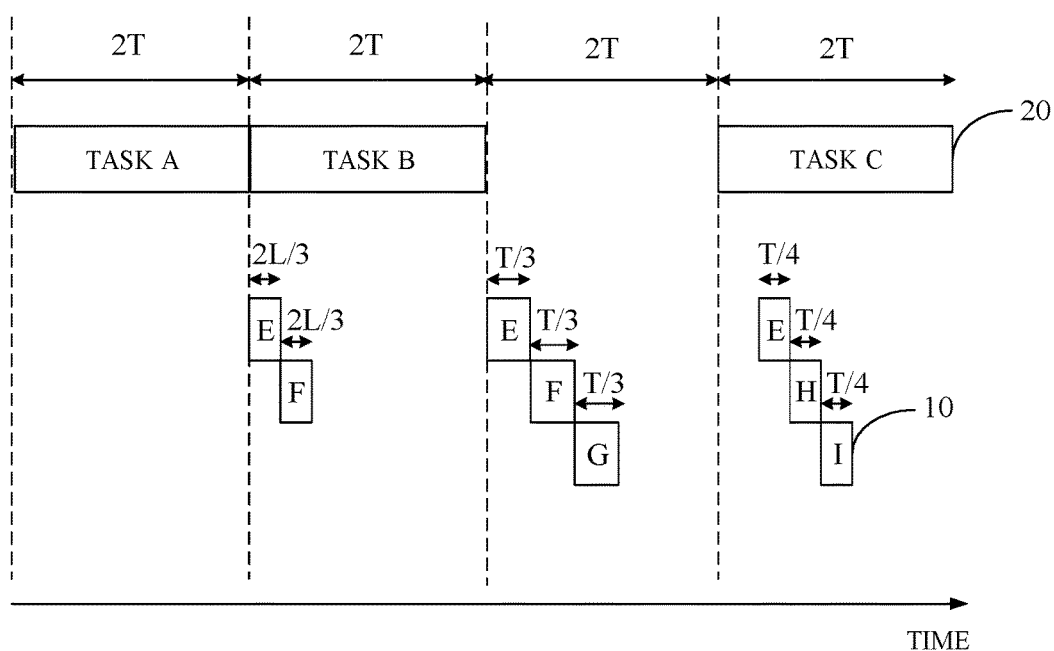
FIG. 3 is a schematic diagram of running timing of tasks in a task group according to an embodiment.

Step S160: putting each task of the task group into a waiting state when each tasks in the task group is out of a corresponding run period in unit time Specifically, in unit time, the task is executed only in the running period corresponding to each task in the task group, and the duration of the running period is equal to the allowable run time per unit time for the task. FIG. 3 is a schematic diagram of execution of tasks in a task group according to an embodiment. As shown in FIG. 3, in the second unit time of 2T, it is assumed that the resource usage time quota of the task group 10 is 2L and the allowable run time of the tasks E and F is 2L/3. The tasks E and F are executed in the corresponding running period respectively, and the tasks E and F are in the waiting state respectively when they are outside the corresponding running period. The waiting state means that the task does not use any resources. The sum of the allowable run time of the tasks E and F is less than the resource usage time quota2L of the task group 10. In the third unit time of 2T, it is assumed that the resource usage time quota of the task group 10 is T and the allowable run time of the tasks E, F and G is T/3. The tasks E, F and G are executed in the corresponding running periods respectively, and the tasks E, F and G are in the waiting state respectively when they are outside the corresponding running period. A sum of the allowable run time of the tasks E, F and G is equal to the resource usage time quota T of the task group 10. It is only necessary to ensure that the sum of the allowable run time of all the tasks in the task group in unit time is less than or equal to the resource usage time quota of the task group, and what period in unit time each task in the task group is run is decided by an algorithm of a task scheduler of an operating system. In other embodiments, the tasks in the task group may first be put into the waiting state in unit time, and then are executed. For example, all the tasks in the task group may first be put into the waiting state in unit time of 2T, and after T time, each task is executed according to the allowable run time of each task in the task group. It can be understood that the method is essentially the same as the resource management method of FIG. 3.

The above resource management method determines the resource usage time quota of the group by comparing the sum of the preset task times corresponding to all the tasks in the task group and the preset time threshold, so that resources available for the tasks in the group can be dynamically controlled according to the preset task time corresponding to each task in the group, thereby ensuring that resource usage time obtained by each task in the group is within a reasonable range, improving resource usage efficiency and saving resources. In addition, each task in the group is only run in its corresponding running period in unit time, which can not only guarantee the completion of work in the group, but also reduce the resource competition with the tasks outside the group, so that the tasks outside the group have higher resource usage efficiency.

Figure 4:
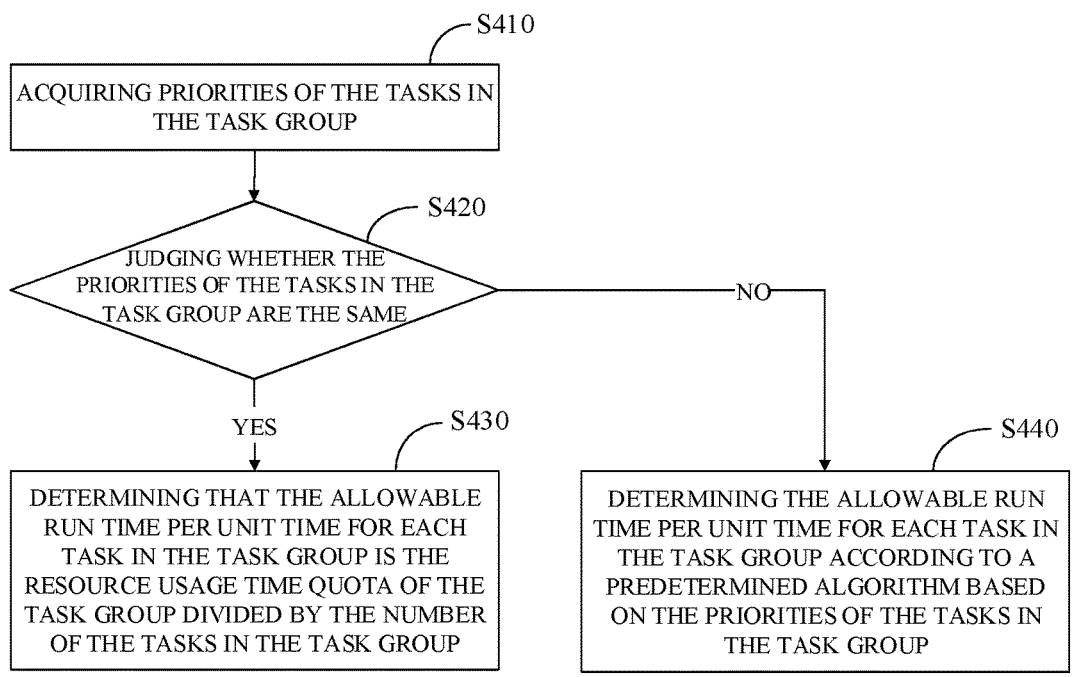
FIG. 4 is a schematic flowchart of determining allowable run time per unit time for each task in a task group according to an embodiment.

As shown in FIG. 4, in one embodiment, the step of determining the allowable run time per unit time for each task in the task group specifically includes:

Step S410: acquiring priorities of the tasks in the task group

Specifically, in unit time, the tasks in the task group may at most obtain resources of the resource usage time quota of the task group. If there are no tasks outside the task group being executed at this time, the tasks in the task group are no required to compete with other tasks outside the task group for resources. The allowable run time of the tasks in the task group can be determined according to according to a predetermined algorithm based on the priorities of the tasks. Tasks with a higher priority in the task group may usually obtain more allowable run time tasks with a lower priority.

Step S420: judging whether the priorities of the tasks in the task group are the same, if the priorities of the tasks in the task group are the same and there are no tasks outside the task group being executed, performing step S430, and if not, performing step S440.

Specifically, if the priorities of the tasks in the task group are the same, the allowable run time per unit time for each task in the task group is the resource usage time quota of the task group divided by the number of the tasks in the task group, and if the priorities of the tasks in the task group are different, the allowable run time per unit time for each task in the task group is determined according to the predetermined algorithm based on the priorities of the tasks.

Figure 5:
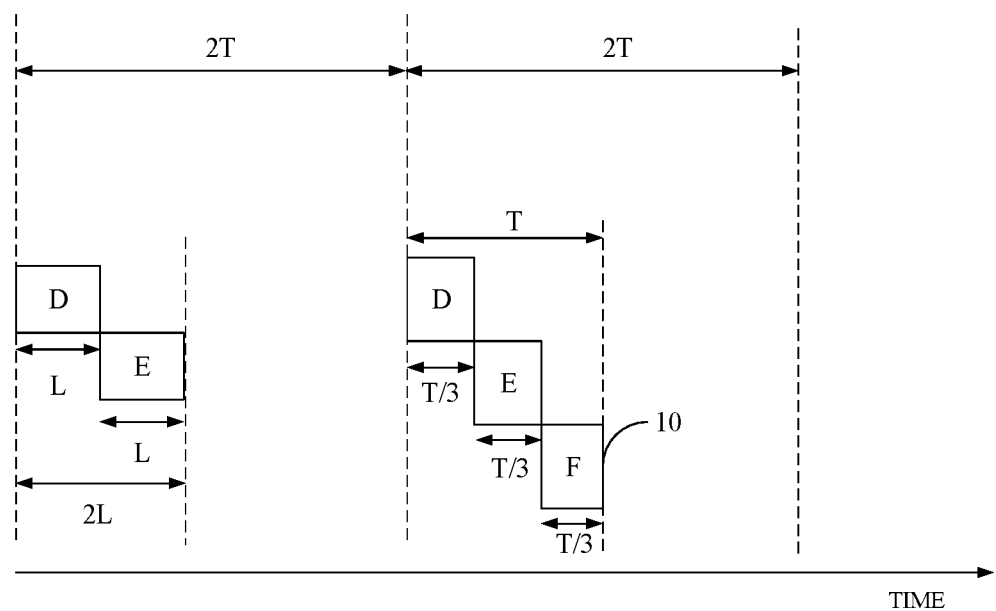
FIG. 5 is a schematic diagram of running timing of tasks in a task group according to another embodiment.

Step S430: determining that the allowable run time per unit time for each task in the task group is the resource usage time quota of the task group divided by the number of the tasks in the task group Specifically, for example, as shown in FIG. 5, in the first unit time of 2T, there are no tasks outside the task group being executed. Assuming that the resource usage time quota of the task group 10 is 2L and the task group 10 includes the task D and the task E, the number of the tasks is 2, resource usage time of L is allocated to each of the task D and the task E. In the second unit time of 2T, there are no tasks outside the task group being executed. Assuming that the resource usage time quota of the task group is T and the task group 10 includes the tasks D, E and F, resource usage time of T/3 is allocated to each of the task D, the task E and the task F. In other embodiments, if there are tasks outside the task group being executed, the allowable run time of the tasks in the task group is shorter than the resource usage time obtained in the embodiment.

Step S440: determining the allowable run time per unit time for each task in the task group according to a predetermined algorithm based on the priorities of the tasks in the task group.

Specifically, in unit time, if the priorities of the tasks in the task group are different, the tasks in the task group are sorted according to the order of the priorities, and the tasks with higher priorities are prior the tasks with lower priorities. The resource usage time of the tasks in the task group can be determined according to according to the predetermined algorithm based on the priorities of the tasks. For example, in unit time of 2T, there are no tasks outside the task group being executed. Assuming that the resource usage time quota of the task group is 2L, the task group includes the tasks D and E and the priority of the task D is higher than that of the task E, resource usage time of 4L/3 can be allocated to the task D, and resource usage time of 2L/3 can be allocated to the task E. When the tasks in the task group are not in the corresponding running period, the tasks in the task group immediately are put into the waiting state respectively.

In the above resource management method, each task in the group is only run in the corresponding running period in unit time, and the resource usage time is determined according to the priorities of the tasks in the task group, so that the tasks can be run better, thereby not only ensuring the completion of work in the group, but also reducing resource competition with the tasks outside the group. Thus, the tasks outside the group have better resource usage efficiency.

In another embodiment, the step of determining the allowable run time per unit time for each task in the task group further includes the following steps.

(1) acquiring priorities of tasks outside the task group being executed and the tasks in the task group.

Specifically, if there are tasks outside the task group being executed in unit time besides the tasks in the task group, the tasks outside the task group and the tasks in the task group will compete for resources. The priorities of the tasks outside the task group being executed and each task in the task group are acquired, and resource usage time of each task is determined according to the priorities. Tasks with higher priority may usually obtain more allowable run time than tasks with lower priority.

(2) judging whether the priorities of the tasks outside the task group and the tasks in the task group are the same, if YES, performing (3), and if NOT, performing (4).

(3) determining that the allowable run time per unit time for each task in the task group is the resource usage time quota of the task group divided by a sum of the number of the tasks outside the task group and the number of the tasks in the task group.

Specifically, if the priorities of the tasks outside the task group and the tasks in the task group are the same in unit time, the allowable run time per unit time for each task in the task group is the resource usage time quota of the task group divided by the sum of the number of the tasks outside the task group and the number of the tasks in the task group. For example, in FIG. 3, in the fourth unit time of 2T, assuming that the resource usage time quota of the task group 10 is T and there are a task C outside the task group and three tasks E, H and I in the task group, each task obtains resource usage time of T/4 on average. The task C outside the task group can also obtain time of T except the resource usage time quota of the task group in unit time, and then resource usage time of T+T/4 in unit time can be totally allocated to the task C outside the task group. In other embodiments, when the priorities of the tasks outside the task group and the tasks in the task group are the same, a half of the resource usage time quota of the task group can be allocated to the tasks outside the task group and the tasks in the task group respectively, and the allowable run time of each task in the task group is a half of the resource usage time quota of the task group divided by the number of the tasks in the task group. For example, resource usage time of the task group in unit time is T, the task group includes the tasks E, F and G, then the tasks E, F and G obtain resource usage time of T/2 in total, each task obtains resource usage time of T/6, and the tasks outside the task group obtain resource usage time of T+T/2. The allocating method is related to the algorithm of the task scheduler in the operating system.

(4) determining the allowable run time per unit time for each task in the task group according to the predetermined algorithm based on the priorities of the tasks outside the task group and the tasks in the task group Specifically, in the resource usage time of unit time, if the priorities of the tasks outside the task group and the tasks in the task group are different, the allowable run time of the tasks in the task group can be determined according to the predetermined algorithm based on the priorities of the tasks outside the task group and the tasks in the task group.

In the above resource management method, each task in the group is only run in the corresponding running period in unit time, and the resource usage time of the tasks is determined according to the priorities of the tasks, so that resource scheduling may be performed better to finish work. When each task in the group is outside the corresponding run period, each task is put into the waiting state, and the sum of the allowable run time of all the tasks in the group does not exceed the resource usage time quota of the group, which can guarantee the completion of work in the group, and can also reduce the resource competition with the task resources outside the group, so that tasks outside the group have better resource use efficiency.

Figure 6:
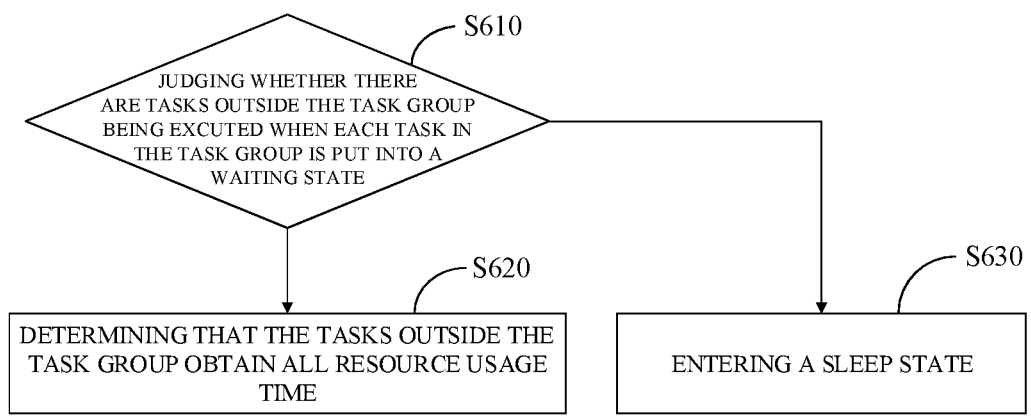
FIG. 6 is a schematic flowchart illustrating the process when all tasks in a task group are put into a waiting state in unit time according to an embodiment.

As shown in FIG. 6, in one embodiment, the step of putting each task in the task group into the waiting state in unit time when each task in the task group is outside a corresponding running period further includes:

Step S610: judging whether there are tasks outside the task group being executed when each task in the task group is put into the waiting state, if YES, performing step S620, and if NO, performing step S630.

Figure 7:
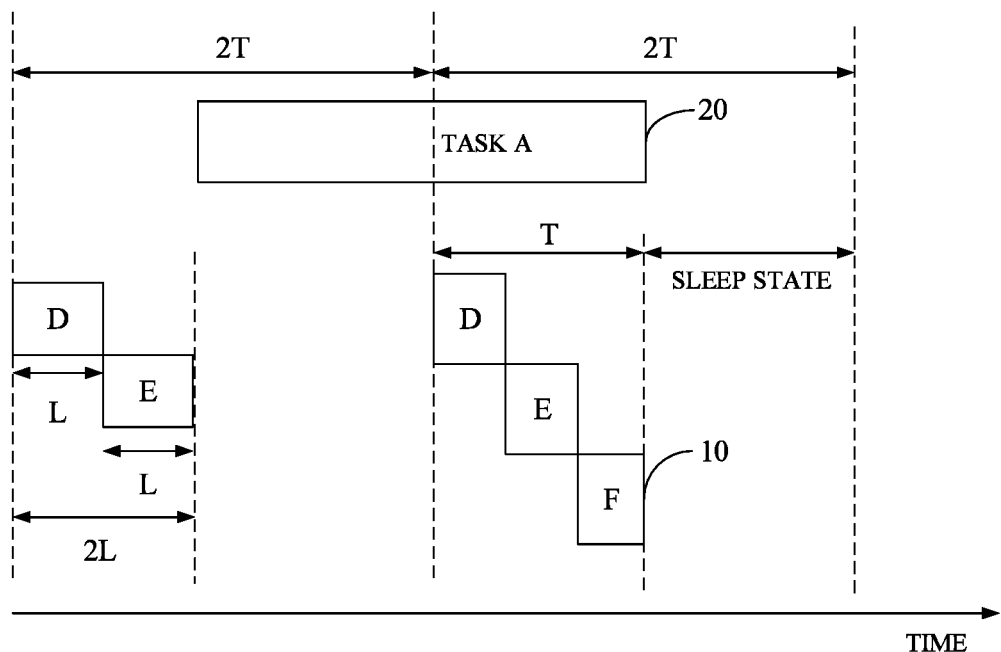
FIG. 7 is a schematic diagram of running timing of tasks in a task group according to another embodiment.

Specifically, when there are tasks outside the task group being executed if the tasks in the task group are all put into the waiting state in unit time, it is determined that the tasks outside the task group being executed obtain all the resource usage time, and if there are no tasks outside the task group being executed, the sleep state can be entered. Entering the sleep state means that the device executing the resource management method enters the sleep state to achieve power saving. For example, as shown in FIG. 7, in the first unit time of 2T, after the task E in the task group 10 is run for the time L, it is put into the waiting state, and the task D in the task group 10 has previously been put into the waiting state. After the task E is put into the waiting state, since only the task A in the task group is being executed, the task A obtains all the resource usage time, so that the tasks outside the task group have higher resource usage efficiency. In the second unit time of 2T, after the tasks D, E and F in the task group 10 are all put into the waiting state and there are no tasks outside the task group being executed, the sleep state is entered.

Step S620: determining that the tasks outside the task group obtain all resource usage time.

Step S630: entering a sleep state.

In the above resource management method, when all the tasks in the group are put into the waiting state and there are no tasks outside the group being executed, the sleep state is entered, so that power consumption of the device may be reduced.

Figure 8:
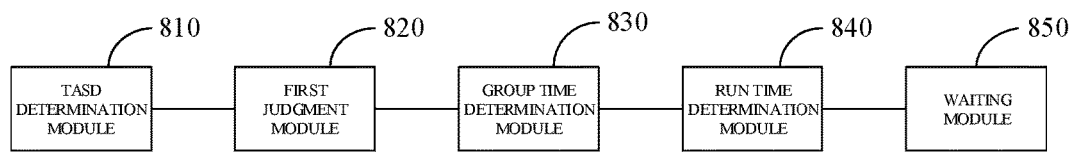
FIG. 8 is a schematic structure diagram of a resource management system according to an embodiment.

As shown in FIG. 8, a resource management system includes a task determination module 810, a first judgment module 820, a group time determination module 830, a run time determination module 840 and a waiting module 850.

The task determination module 810 is configured to determine tasks in a task and a preset task time corresponding to each task in the task group.

Specifically, the preset task time is a preset resource usage time upper limit in in unit time available for the task in the task group, that is, run time per unit time for each task in the task group does not exceeds its corresponding task time. In this embodiment, the preset task times corresponding to all the tasks in the task group can be set to be the same. For example, assuming that the unit time is 2T and the task time is L, L may be T/2, T/4 and the like. Each task in the task group can at most use resources of time L every unit time of 2T. T may be a numerical value of relatively short time such as 10 seconds (s), 15 s and 20 s. The resources may be a CPU, a GPU, a memory and the like. It can be understood that the preset task time corresponding to each task in the task group may be set according to actual needs, and is not necessarily the same.

The first judgment module 820 is configured to judge whether a sum of the preset task times corresponding to all the tasks in the task group is less than a preset time threshold.

Specifically, the time threshold is a preset resource usage time upper limit of the task group per unit time. The unit time, the time threshold and the task time may be set as needed. The relationship among the three is that the unit time is greater than the time threshold and the time threshold is greater than the task time. The sum of the preset task times corresponding to all the tasks in the task group and the time threshold are compared; if the sum of the preset task times corresponding to all the tasks in the task group is less than the time threshold, the resource usage time quota in unit time of the task group is determined to be the sum of the preset task times corresponding to all the tasks in the task group; and if the sum of the preset task times corresponding to all the tasks in the task group is not less than the time threshold, the resource usage time quota in unit time of the task group is determined to be the time threshold. As shown in FIG. 2, a task 20 outside a task group and the task group 10 are included. The preset task time corresponding to tasks D and E in the task group 10 is set to L, and the time threshold is set to T. In the first unit time of 2T, a sum of the preset task time corresponding to the tasks D and E in the task group 10 is 2L, which is less than the preset time threshold T, and then the resource usage time quota of the task group 10 is 2L. In the second unit time of 2T, the task group 10 includes tasks D, E and F, and the preset task time corresponding to the tasks D, E and F in the task group 10 is set to L. The sum of the preset task time corresponding to the tasks D, E and F in the task group 10 is 3L, which is greater than the time threshold T, and then the resource usage time quota of the task group 10 is T. A sum of the allowable run time per unit time for all the tasks in the task group is less than or equal to the resource usage time quota of the task group.

The group time determination module 830 is configured to determine a resource usage time quota of the task group as the sum of the preset task times corresponding to all the tasks in the task group when the sum of the preset task times corresponding to all the tasks in the task group is less than the preset time threshold.

Specifically, the resource usage time quota of the task group is determined by comparing the sum of the preset task times corresponding to all the tasks in the task group with the time threshold, which can avoid resource waste when the number of the tasks in the task group is too few. The resource usage time obtained by each task in the task group is controlled within a reasonable range. For example, the unit time is set to 2T, the time threshold is set to T, there is only one task in the task group and a preset task time corresponding to the task is T/4. If the resource usage time quota of the task group is not determined by comparing the sum of the preset task times corresponding to all the tasks in the task group with the time threshold. Therefore, the task may use time resources of T in unit time of 2T, which may cause problems such as low resource usage efficiency and the like at this time. However, after resource usage time quota of the task group is determined by comparison, the task may at most use time resources of T/4 in unit time of 2T, which can improve the resource usage efficiency.

The group time determination module 830 is further configured to determine the resource usage time quota of the task group as the time threshold when the sum of the preset task times corresponding to all the tasks in the task group is not less than the preset time threshold, The run time determination module 840 is configured to determine allowable run time per unit time for each task in the task group.

Specifically, time is divided into a plurality of continuous unit time for monitoring. The tasks in the task group have a resource usage right only in a portion of time period in unit time, that is, each task in the task group is run only in the corresponding time period. The duration of the portion of period is equal to previously determined allowable run time. The sum of the allowable run time per unit time for all the tasks in the task group is less than or equal to the previously determined resource usage time quota of the task group.

The waiting module 850 is configured to put each task in the task group into a waiting state when each task in the task group is outside a corresponding running period in unit time.

Specifically, in unit time, each task in the task group is executed only in the running period corresponding to the task, and the duration of the running period is equal to the allowable run time per unit time for the task. FIG. 3 is a schematic diagram of running timing of tasks in a task group according to one embodiment. As shown in FIG. 3, in the second unit time of 2T, assuming that the resource usage time quota of the task group 10 is 2L and the allowable run time of the tasks E and F is 2L/3, the tasks E and F are performed in running periods respectively corresponding to the tasks, and the tasks E and F, and the tasks, and the tasks E and F are in the waiting state respectively when they are outside their corresponding running periods. The waiting state refers to that the task may use no resources. A sum of the allowable run time of the tasks E and F is smaller than the resource usage time quota2L of the task group 10. In the third unit time of 2T, assuming that the resource usage time quota of the task group 10 is T and the allowable run time of the tasks E, F and G is T/3, the tasks E, F and G are performed in running periods respectively corresponding to the tasks, and the tasks E, F and G, and the tasks, and the tasks E, F and G are in the waiting state respectively when they are outside the their corresponding running periods. A sum of the allowable run time of the tasks E, F and G is equal to the resource usage time quota T of the task group 10. It is only necessary to ensure that the sum of the allowable run time per unit time for all the tasks in the task group is less than or equal to the resource usage time quota of the task group, and what period each task in the task group is run in unit time is determined by an algorithm of a task scheduler of an operating system. In other embodiments, the tasks in the task group may be first put into the waiting state in unit time, and then are performed. For example, in unit time of 2T, all the tasks in the task group are first put into the waiting state, and after time of T, each task is performed according to the allowable run time of each task in the task group. It can be understood that the system is essentially consistent with the resource management system of FIG. 3.

In one embodiment, the above resource management system further includes a creation module.

The creation module is configured to create the task group and add specific tasks into the task group according to a predetermined rule.

Specifically, the task group is created to manage the task. Only the tasks in the task group are limited by the resource usage time quota of the task group. The tasks in the task group may be background tasks which are not required to interact with a user, for example, background tasks such as mail service, messaging and automatic saving. Some tasks are added into the task group, and resource usage is limited, which can ensure that tasks in the task group can be performed normally, and prevent tasks in the task group from unrestrictedly preempting resources with other tasks outside the task group, thereby causing a waste of resource waste. It can be understood that other rules may also be set as needed, and then specific tasks consistent with the rule are added into the task group.

The above resource management system determines the resource usage time quota of the group by comparing the sum of the preset task times corresponding to all the tasks in the task group and the preset time threshold, which can dynamically control resources available for the tasks in the group according to the preset task time corresponding to each task in the group, and ensure that resource usage time obtained by each task in the group is within a reasonable range, thereby improving resource usage efficiency and saving resources. In addition, each task in the group is only run in the corresponding running period in unit time, which can not only guarantee the completion of work in the group, but also reduce the resource competition with the task resources outside the group, so that tasks outside the group have higher better resource use efficiency.

Figure 9:
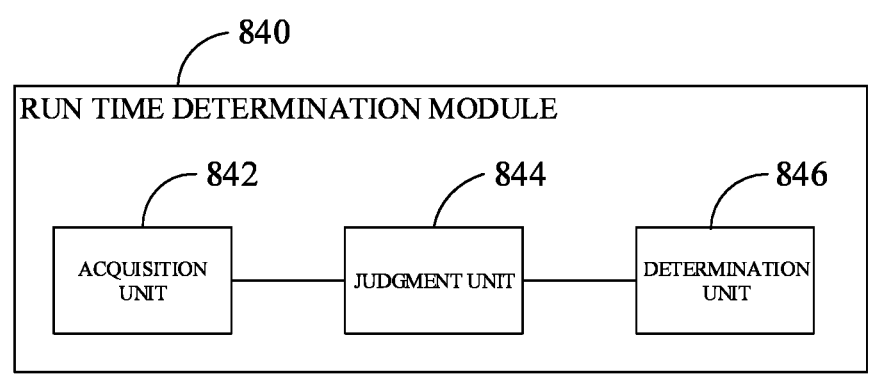
FIG. 9 is a schematic diagram of an internal structure of a run time determination module according to an embodiment.

As shown in FIG. 9, in one embodiment, the run time determination module 840 includes an acquisition unit 842, a judgment unit 844 and a determination unit 846.

The acquisition unit 842 is configured to acquire priorities of the tasks in the task group.

Specifically, in unit time, the tasks in the task group can at most obtain resources of the resource usage time quota of the task group. If there are no tasks outside the task group being executed at this time, the tasks in the task group are not required to compete with other tasks outside the task group for resources, and the allowable run time of the tasks in the task group can be determined according to a predetermined algorithm based on the priorities of the tasks. In general, a task with a higher priority in the task group can obtain more allowable run time than a task with a lower priority.

The judgment unit 844 is configured to judge whether the priorities of the tasks in the task group are the same.

Specifically, if the priorities of the tasks in the task group are the same, the allowable run time per unit time for each task in the task group is the resource usage time quota of the task group divided by the number of the tasks in the task group, and if the priorities of the tasks in the task group are different, the allowable run time per unit time for each task in the task group is determined according to the predetermined algorithm based on the priorities of the tasks.

The determination unit 846 is configured to determine that the allowable run time per unit time for each task in the task group is the resource usage time quota of the task group divided by the number of the tasks in the task group when the priorities of the tasks in the task group are the same and there are no tasks outside the task group being executed.

Specifically, for example, as shown in FIG. 5, in the first unit time of 2T, there are no tasks outside the task group being executed. Assuming that the resource usage time quota of the task group 10 is 2L, the task group 10 includes the task D and the task E, and the number of the tasks is 2, resource usage time of L is allocated to each of the task D and the task E respectively; and in the second unit time of 2T, there are no tasks outside the task group being executed. Assuming that the resource usage time quota of the task group is T and the task group 10 includes the tasks D, E and F, resource usage time of T/3 is allocated to each of the task D, the task E and the task F. In other embodiments, if there are tasks outside the task group being executed, the allowable run time of the tasks in the task group will be less than the resource usage time obtained in the embodiment.

The determination unit 846 is further configured to determine the allowable run time per unit time for each task in the task group according to a predetermined algorithm based on the priorities of the tasks in the task group when the priorities of the tasks in the task group are different.

Specifically, if the priorities of the tasks in the task group are different in unit time, the tasks in the task group are sorted according to the priorities, and the task with higher priority is in front of the task with lower priority. The resource usage time of the tasks in the task group can be determined according to the predetermined algorithm based on the priorities of the tasks. For example, in unit time of 2T, there are no tasks outside the task group being executed. Assuming that the resource usage time quota of the task group is 2L, the task group includes tasks D and E and the priority of the task D is higher than that of the task E, resource usage time of 4L/3 can be allocated to the task D, and resource usage time of 2L/3 can be allocated to the task E. When the tasks in the task group are in the corresponding running period, the tasks in the task group are immediately put into the waiting state respectively.

In the above resource management system, each task in the group is only run in the corresponding running period in unit time, and the resource usage time is determined according to the priorities of the tasks in the task group to run the tasks better, which can ensure the completion of work in the group, and can also reduce the resource competition with the task resources outside the group, so that tasks outside the group have higher resource use efficiency.

In another embodiment, the acquisition unit 842 is further configured to acquire priorities of the tasks outside the task group being executed and the tasks in the task group.

Specifically, if there are tasks outside the task group being executed besides the tasks in the task group in unit time, the tasks outside the task group will compete for resources and the tasks in the task group. The priorities of the tasks outside the task group being executed and each task in the task group are acquired, and resource usage time of each task is determined according to the priorities. In general, tasks with higher priority will obtain more allowable run time than tasks with lower priority.

The judgment unit 844 is further configured to judge whether the priorities of the tasks outside the task group and the tasks in the task group are the same.

The determination unit 846 is further configured to determine that the allowable run time per unit time for each task in the task group is the resource usage time quota of the task group divided by a sum of the number of the tasks outside the task group and the number of the tasks in the task group when the priorities of the tasks outside the task group and the tasks in the task group are the same.

Specifically, if the priorities of the tasks outside the task group and the tasks in the task group are the same in unit time, the allowable run time per unit time for each task in the task group is the resource usage time quota of the task group divided by the sum of the number of the tasks outside the task group and the number of the tasks in the task group. For example, in FIG. 3, in the fourth unit time of 2T, assuming that the resource usage time quota of the task group 10 is T and there are one task C outside the task group and three tasks E, H and I in the task group, each task obtains resource usage time of T/4 on average. The task C outside the task group can also obtain time of T in unit time except the resource usage time quota of the task group, and resource usage time of T+T/4 in unit time is totally allocated to the task C outside the task group. In other embodiments, when the priorities of the tasks outside the task group and the tasks in the task group are the same, a half of the resource usage time quota of the task group can be allocated to the tasks outside the task group and the tasks in the task group respectively, and the allowable run time of each task in the task group is a half of the resource usage time quota of the task group divided by the number of the tasks in the task group. For example, in unit time, resource usage time of the task group is T, the task group includes the tasks E, F and G, then the tasks E, F and G obtain resource usage time of T/2 in total, and each task obtains resource usage time of T/6, and the tasks outside the task group are allocated resource usage time of T+T/2. The allocating method is related to the algorithm of the task scheduler in the operating system.

The determination unit 846 is further configured to determine the allowable run time per unit time for each task in the task group based on the priorities of tasks outside the task group and the tasks in the task group according to a predetermined algorithm when the priorities of the tasks outside the task group and the tasks in the task group are different.

Specifically, in the resource usage time of unit time, if the priorities of the tasks outside the task group and the tasks in the task group are different, the allowable run time of the tasks in the task group may be determined according to the predetermined algorithm based on the priorities of the tasks outside the task group and the tasks in the task group and.

In the above resource management system, each task in the group is only run in the corresponding running period in unit time, and the resource usage time of the tasks is determined according to priorities of the tasks, so that resource scheduling may be performed better to finish work. When each task in the group is outside the corresponding running period, each task is put into the waiting state, and the sum of the allowable run time of all the tasks in the group does not exceed the resource usage time quota of the group, which can guarantee the completion of work in the group, and can also reduce the competition with the task resources outside the group, so that tasks outside the group have better resource use efficiency.

In one embodiment, the above resource management system further includes a second judgment module and a sleep module, besides the task determination module 810, the first judgment module 820, the group time determination module 830, the run time determination module 840 and the waiting module 850.

The second judgment module is configured to judge whether there are tasks outside the task group being executed when each task in the task group is put into the waiting state.

Specifically, when the tasks in the task group are all put into the waiting state in unit time if there are tasks outside the task group being executed, it is determined that the tasks outside the task group being executed obtain all the resource usage time, and if there are no tasks outside the task group being executed, the system enters the sleep state, and entering the sleep state means that the device executing the resource management method enters the sleep state to achieve power saving. For example, as shown in FIG. 7, in the first unit time of 2T, after the task E in the task group 10 is run for L time, it is put into the waiting state, and the task D in the task group 10 has been put into the waiting state. After the task E is put into the waiting state, since only the task A in the task group is being executed, the task A obtains all the resource usage time, so that the tasks outside the task group can have higher resource usage efficiency. In the second unit time of 2T, when the tasks D, E and F in the task group 10 are all put into the waiting state and there are no tasks outside the task group being executed, the system enters the sleep state.

The run time determination module 840 is further configured to determine that the tasks outside the task group obtain all resource usage time when there are tasks outside the task group being executed if each task in the task group is put into the waiting state.

The sleep module is configured to enter a sleep state when there are no tasks outside the task group being executed if each task in the task group is put into the waiting state.

In the above resource management system, when all the tasks in the group are put into the waiting state and there are no tasks outside the group being executed, the system enters the sleep state, which can reduce power consumption of the device.

The embodiments of the disclosure further provide a computer storage medium storing computer-executable instructions configured to execute the resource management method described in any one of the above embodiments.

Each technical feature of the above embodiments may be combined arbitrarily. For make the description brief, not all possible combinations of the technical features in the above embodiments are described. However, as long as there is no contradiction in the combinations of these technical features, all combinations of these technical features should be considered to be within the scope recorded by the specification.

The above embodiments merely represent some implementations of the disclosure, are specifically described in detail, but it should not be understood as limiting the scope of patent of the disclosure. It should be noted that, for those skilled in the art, several variations and improvements may be made without departing from the concept of the disclosure, and these are all within the protection scope of the disclosure. Therefore, the scope of protection of the disclosure shall be subject to the appended claims.

INDUSTRIAL APPLICABILITY

The resource management solution according to the embodiments of the disclosure determines the resource usage time quota of the group by comparing the sum of the preset task times corresponding to all the tasks in the task group and the preset time threshold, so that resources available for the tasks in the group can be dynamically controlled according to the preset task time corresponding to each task in the group, thereby ensuring that resource usage time obtained by each task in the group within a reasonable range, improving resource usage efficiency, and saving resources. In addition, each task in the group only runs in the corresponding running period in unit time, which can not only ensure the completion of work in the group, but also reduce resource competition with the tasks outside the group, so that the tasks outside the group have higher resource usage efficiency.

The invention claimed is:

1. A resource management method, comprising:
   determining tasks in a task group and a preset task time corresponding to each task in the task group;
   judging whether a sum of the preset task times corresponding to all the tasks in the task group is less than a preset time threshold;
   if YES, determining a resource usage time quota of the task group to be the sum of the preset task times corresponding to all the tasks in the task group;
   if NO, determining the resource usage time quota of the task group to be the time threshold;
   determining allowable run time per unit time for each task in the task group, a sum of the allowable run time per unit time for all the tasks in the task group being less than or equal to the resource usage time quota of the task group; and
   when each task in the task group is outside a corresponding running period in unit time, putting each task in the task group into a waiting state.

2. The resource management method according to claim 1, before the step of determining the tasks in the task group and the preset task time corresponding to each task in the task group, further comprising:
   creating the task group, and adding specific tasks into the task group according to a predetermined rule.

3. The resource management method according to claim 1, wherein determining the allowable run time per unit time for each task in the task group specifically comprises:
   acquiring priorities of the tasks in the task group;
   judging whether the priorities of the tasks in the task group are the same;
   if the priorities of the tasks in the task group are the same and there are no tasks outside the task group being executed, determining that the allowable run time per unit time for each task in the task group is the resource usage time quota of the task group divided by the number of the tasks in the task group; and
   if NO, determining the allowable run time per unit time for each task in the task group according to a predetermined algorithm based on the priorities of the tasks in the task group.

4. The resource management method according to claim 1, wherein determining the allowable run time per unit time for each task in the task group specifically comprises:

acquiring priorities of tasks outside the task group being executed and the tasks in the task group;

judging whether the priorities of the tasks outside the task group and the tasks in the task group are the same;

if YES, determining that the allowable run time per unit time for each task in the task group is the resource usage time quota of the task group divided by a sum of the number of the tasks outside the task group and the number of the tasks in the task group; and if NO, determining the allowable run time per unit time for each task in the task group according to the predetermined algorithm based on the priorities of the tasks outside the task group and the tasks in the task group.

5. The resource management method according to claim 4, after the step of putting each task in the task group into the waiting state when each task in the task group is outside the corresponding running period in unit time, further comprising:

judging whether there are tasks outside the task group being executed when each task in the task group is put into the waiting state;

if YES, determining that the tasks outside the task group obtain all resource usage time; and if NO, putting each task in the task group into a sleep state.

6. The resource management method according to claim 2, wherein determining the allowable run time per unit time for each task in the task group specifically comprises:

acquiring priorities of the tasks in the task group;

judging whether the priorities of the tasks in the task group are the same;

if the priorities of the tasks in the task group are the same and there are no tasks outside the task group being executed, determining that the allowable run time per unit time for each task in the task group is the resource usage time quota of the task group divided by the number of the tasks in the task group; and if NO, determining the allowable run time per unit time for each task in the task group according to a predetermined algorithm based on the priorities of the tasks in the task group.

7. The resource management method according to claim 2, wherein determining the allowable run time per unit time for each task in the task group specifically comprises:

acquiring priorities of tasks outside the task group being executed and the tasks in the task group;

judging whether the priorities of the tasks outside the task group and the tasks in the task group are the same;

if YES, determining that the allowable run time per unit time for each task in the task group is the resource usage time quota of the task group divided by a sum of the number of the tasks outside the task group and the number of the tasks in the task group; and if NO, determining the allowable run time per unit time for each task in the task group according to the predetermined algorithm based on the priorities of the tasks outside the task group and the tasks in the task group.

8. A resource management system, comprising:

a task determination module configured to determine tasks in a task group and a preset task time corresponding to each task in the task group;

a first judgment module configured to judge whether a sum of the preset task times corresponding to all the tasks in the task group is less than a preset time threshold;

a group time determination module configured to determine that a resource usage time quota of the task group is the sum of the preset task times corresponding to all the tasks in the task group when the sum of the preset task times corresponding to all the tasks in the task group is less than the preset time threshold;

the group time determination module further configured to determine that the resource usage time quota of the task group is the time threshold when the sum of the preset task times corresponding to all the tasks in the task group is not less than the preset time threshold;

a run time determination module configured to determine allowable run time per unit time for each task in the task group, a sum of the allowable run time per unit time for all the tasks in in the task group being less than or equal to the resource usage time quota of the task group; and a waiting module, configured to put each task in the task group into a waiting state when each task of the task group is outside a corresponding run period in unit time.

9. The resource management system according to claim 8, further comprising:

a creation module configured to create the task group and add specific tasks into the task group according to a predetermined rule.

10. The resource management system according to claim 8, wherein the run time determination module comprises:

an acquisition unit configured to acquire priorities of the tasks in the task group;

a judgment unit configured to judge whether the priorities of the tasks in the task group are the same; and a determination unit configured to determine that the allowable run time per unit time for each task in the task group is the resource usage time quota of the task group divided by the number of the tasks in the task group when the priorities of the tasks in the task group are the same and there are no tasks outside the task group being executed;

the determination unit further configured to determine the allowable run time per unit time for each task in the task group according to a predetermined algorithm based on the priorities of the tasks in the task group when the priorities of the tasks in the task group are different.

11. The resource management system according to claim 10, wherein the acquisition unit is further configured to acquire priorities of tasks outside the task group being executed and the tasks in the task group;

the judgment unit is further configured to judge whether the priorities of the tasks outside the task group and the tasks in the task group are the same;

the determination unit is further configured to determine that the allowable run time per unit time for each task in the task group is the resource usage time quota of the task group divided by a sum of the number of the tasks outside the task group and the number of the tasks in the task group when the priorities of the tasks outside the task group and the tasks in the task group are the same; and the determination unit is further configured to determine the allowable run time per unit time for each task in the task group according to the predetermined algorithm based on the priorities of the tasks outside the task group and the tasks in the task group when on the basis of the priorities of the tasks outside the task group and the tasks in the task group according to the predetermined algorithm when the priorities of the tasks outside the task group and the tasks in the task group are different.

12. The resource management system according to claim 11, further comprising:
a second judgment module configured to judge whether there are tasks outside the task group being executed when each task in the task group is put into the waiting state,
the run time determination module further configured to determine that the tasks outside the task group obtain all resource usage time when there are tasks outside the task group being executed if each task in the task group is put into the waiting state; and
a sleep module configured to put each task in the task group into a sleep state when there are no tasks outside the task group being executed if each task in the task group is put into the waiting state.

13. The resource management system according to claim 9, wherein the run time determination module comprises:
an acquisition unit configured to acquire priorities of the tasks in the task group;
a judgment unit configured to judge whether the priorities of the tasks in the task group are the same; and
a determination unit configured to determine that the allowable run time per unit time for each task in the task group is the resource usage time quota of the task group divided by the number of the tasks in the task group when the priorities of the tasks in the task group are the same and there are no tasks outside the task group being executed;
the determination unit further configured to determine the allowable run time per unit time for each task in the task group according to a predetermined algorithm based on the priorities of the tasks in the task group when the priorities of the tasks in the task group are different.

14. A non-transitory computer storage medium, storing a computer-executable instructions thereon, the computer-executable instructions being configured to perform a resource management method, the method comprising:
determining tasks in a task group and a preset task time corresponding to each task in the task group;
judging whether a sum of the preset task times corresponding to all the tasks in the task group is less than a preset time threshold;
if YES, determining a resource usage time quota of the task group to be the sum of the preset task times corresponding to all the tasks in the task group;
if NO, determining the resource usage time quota of the task group to be the time threshold;
determining allowable run time per unit time for each task in the task group, a sum of the allowable run time per unit time for all the tasks in the task group being less than or equal to the resource usage time quota of the task group; and when each task in the task group is outside a corresponding running period in unit time, putting each task in the task group into a waiting state.

15. The non-transitory computer storage medium according to claim 14, before the step of determining the tasks in the task group and the preset task time corresponding to each task in the task group, further comprising:
creating the task group, and adding specific tasks into the task group according to a predetermined rule.

16. The non-transitory computer storage medium according to claim 14, wherein determining the allowable run time per unit time for each task in the task group specifically comprises:
acquiring priorities of the tasks in the task group;
judging whether the priorities of the tasks in the task group are the same;
if the priorities of the tasks in the task group are the same and there are no tasks outside the task group being executed, determining that the allowable run time per unit time for each task in the task group is the resource usage time quota of the task group divided by the number of the tasks in the task group; and
if NO, determining the allowable run time per unit time for each task in the task group according to a predetermined algorithm based on the priorities of the tasks in the task group.

17. The non-transitory computer storage medium according to claim 14, wherein determining the allowable run time per unit time for each task in the task group specifically comprises:
acquiring priorities of tasks outside the task group being executed and the tasks in the task group;
judging whether the priorities of the tasks outside the task group and the tasks in the task group are the same;
if YES, determining that the allowable run time per unit time for each task in the task group is the resource usage time quota of the task group divided by a sum of the number of the tasks outside the task group and the number of the tasks in the task group; and
if NO, determining the allowable run time per unit time for each task in the task group according to the predetermined algorithm based on the priorities of the tasks outside the task group and the tasks in the task group.

18. The non-transitory computer storage medium according to claim 17, after the step of putting each task in the task group into the waiting state when each task in the task group is outside the corresponding running period in unit time, further comprising:
judging whether there are tasks outside the task group being executed when each task in the task group is put into the waiting state;
if YES, determining that the tasks outside the task group obtain all resource usage time; and
if NO, putting each task in the task group into a sleep state.

* * * * *